Feb. 13, 1968   J. W. BOZEK   3,368,679
FILTER WITH DROP-IN ELEMENT
Filed April 29, 1965   2 Sheets-Sheet 1

INVENTOR.
JOHN W. BOZEK
BY
Hauke & Hauke
ATTORNEYS

Feb. 13, 1968 J. W. BOZEK 3,368,679
FILTER WITH DROP-IN ELEMENT
Filed April 29, 1965 2 Sheets-Sheet 2

INVENTOR.
JOHN W. BOZEK
BY
Hauke & Hauke
ATTORNEYS

United States Patent Office 3,368,679
Patented Feb. 13, 1968

3,368,679
FILTER WITH DROP-IN ELEMENT
John W. Bozek, Waterford, Mich., assignor to The Rosaen Filter Company, Hazel Park, Mich., a corporation of Michigan
Filed Apr. 29, 1965, Ser. No. 451,758
12 Claims. (Cl. 210—90)

ABSTRACT OF THE DISCLOSURE

A fluid filter device provided with a cylindrical filter element having an upper outwardly extending flange to engage with a spring mounted member upon insertion of the filter element into the housing of the device for mounting the element in place. A retainer is positioned from the exterior of the housing to urge the filter element flange into sealing engagement with the spring mounted member and a pressure responsive indicating and bypass mechanism is provided to indicate the clogged condition of the filter element and to open a bypass path around the element upon it becoming unduly clogged. In one modification of the device fluid flow through the inlet into the interior of the housing is automatically closed upon removal of the element, in another a path is simultaneously opened from the interior of the element to the inlet to prevent backwash during removal and in still another a path is automatically opened bypassing the filter chamber upon the element being removed so that fluid can continue to flow through the device while the element is being cleaned or replaced.

---

The present invention relates to fluid filtering devices and more particularly to an improved means for mounting a filter element in such devices.

Filter elements must be periodically removed from the filter housing for cleaning and or replacement. The present invention provides a filter device which utilizes an improved means for mounting and sealing the element within the housing and which greatly facilitates the installation and removal of the element without tools and without separation of the end cap from the housing.

Several embodiments of the invention will hereinafter be described but in each embodiment the filter element is mounted in the housing by utilizing an exteriorly mounted hand wheel to urge the filter element into sealing engagement with a spring biased mounting member. The filter device is further provided with a pressure differential actuated bypass valve and means indicating the position of the bypass valve to indicate the condition of the filter element.

In one preferred embodiment the filter device includes an inlet valve construction cooperating with the spring biased mounting means to close the inlet upon removal of the filter element. In a modified construction the inlet valve construction includes means opening a fluid flow from the outlet side of the filter element through the inlet. This tends to eliminate particle dislodging back flow which results as the element is removed from the housing.

In another preferred embodiment means are provided to open a fluid path directly from the inlet to the outlet upon removal of the filter element so that the fluid system can be operated even while the filter element is being changed.

It is an object then of the present invention to facilitate the installation and removal of filter elements in filter devices by providing a filter element adapted to be inserted into the filter device and means exteriorly of the filter device for urging the element into a sealed position.

It is another object of the present invention to improve filter devices by providing a spring biased mounting means for engaging the filter element of filter devices and means exteriorly of the filter device for urging the filter element into a mounted and sealing engagement with the mounting means.

It is yet another object of the present invention to decrease the shut down time for fluid systems by providing a filter device in which the filter element can be changed without the necessity of tools and without requiring that the end cap be separated from the housing.

It is yet another object of the present invention to improve filter devices of the aforementioned type by providing a pressure differential actuated bypass means and filter condition indicating means for such filter devices.

It is still another object of the present invention to improve filter devices of the aforementioned type by providing an improved inlet valve construction for such filter devices.

Still further objects and advantages of the present invention will readily occur to one skilled in the art to which the invention pertains upon reference to the following drawings in which like reference characters refer to like parts throughout the several views and in which FIG. 1 is a longitudinal cross sectional view illustrating one preferred filter device of the present invention.

Figure 1:
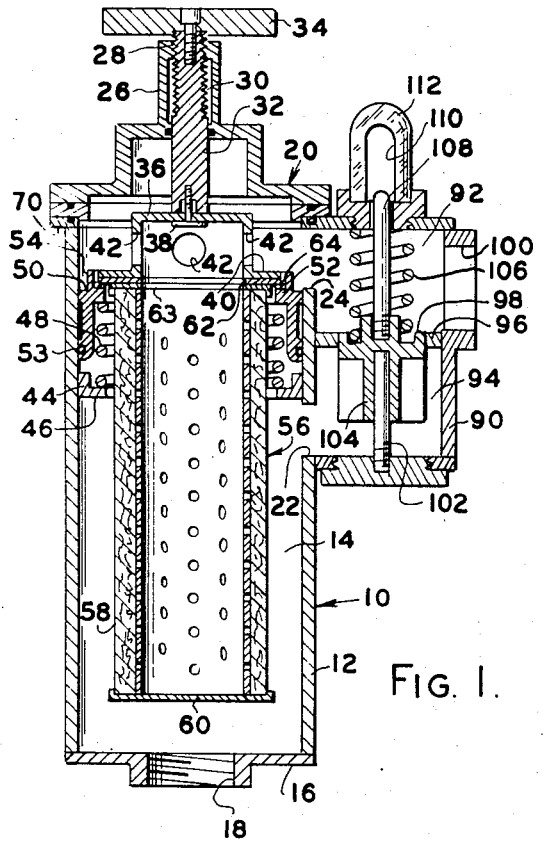

Now referring to the drawings for a more detailed description of the present invention, FIG. 1 illustrates one preferred filter device 10 as comprising a substantially cylindrical housing member 12 defining a filter chamber 14. One end of the filter chamber 14 is closed by a plate 16 secured to the housing member 12 and having a centrally disposed inlet 18. The opposite end of the filter 14 is closed by an end cap 20. A bypass outlet 22 and an outlet 24 are provided in the housing member 12 opening to the filter chamber 14 in axially spaced positions as shown.

The end cap 20 as can best be seen in FIG. 1 preferably comprises an upstanding portion 26 internally threaded as at 28 to receive the threaded end portion 30 of a rod 32. The rod 32 extends axially through the upstanding portion 26 into the filter chamber 14 and carries at its exterior end a hand wheel 34. A substantially cylindrical porting member 36 is secured by a screw member 38 to the interior end of the rod 32 to extend axially therefrom.

The porting member 36 is closed at the end engaging the rod 32 and open at the opposite end so that it forms in effect an inverted cannister or can member. The open end of the porting member 36 is provided with a radially outwardly extending peripheral flange portion 40. A plurality of annularly spaced openings 42 are provided in the porting member 36.

A spring seat member 44 is secured to the inner wall of the housing member 12 and is provided with a radially inwardly extending annular flange portion 46 which forms the seat for one end of a spring member 48. A mounting member 50 is axially slidably mounted on the inner wall of the housing member 12 and is provided with a radially inwardly extending annual flange portion 52 which forms the seat for the opposite end of the spring member 48 so that the spring member 48 urges the mounting member 50 axially toward the end cap 20. A piston ring seal 53 is carried by the mounting member 52 to engage the inner wall of the housing member 12 to prevent fluid leakage therebetween. The flange portion 52 of the mounting member 50 in combination with an axially extending flange portion 54 forms a mounting seat for a substantially cylindrical filter element 56.

The filter element 56 preferably comprises an annular axially elongated medial porous portion 58 closed at one end by a closure plate 60 and having at its opposite end a radially outwardly extending flange portion 62 having a central opening 63. The closure plate 60 and the medial portion 58 of the filter element 56 are dimensioned to pass axially past the flange portions 46 and 52 while the flange portion 62 is of a sufficiently large diameter to be caught by the flange portion 52 of the mounting member 50. An annular seal 64 is carried by the flange portion 52 to engage the flange portion 62 of the filter element 56.

Figure 2:
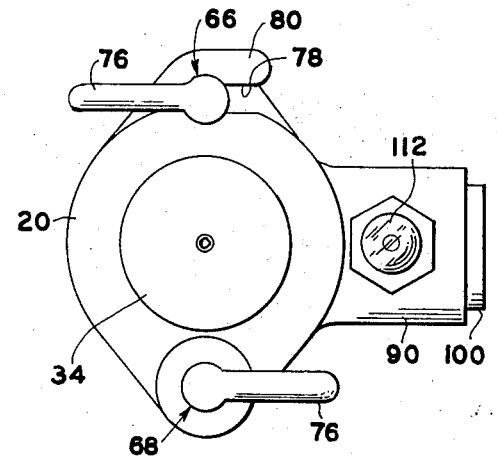
FIG. 2 is a top plan view of the preferred filter device shown in FIG. 1.
Figure 3:
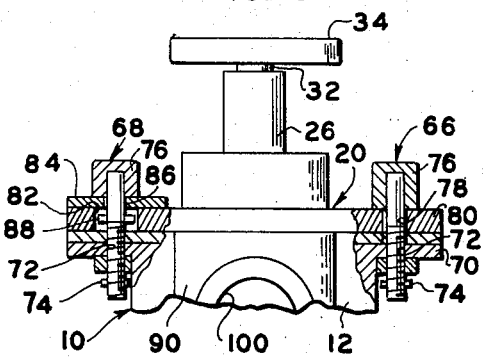
FIG. 3 is a fragmentary elevational view as seen from the right hand side of FIG. 2 and with portions illustrated in cross section for purposes of clarity.

As can best be seen in FIGS. 2-3, the end cap 20 is preferably mounted to the housing member 12 by a pair of oppositely positioned screw members 66–68. The housing member 12 is provided with a radially outwardly extending upper flange 70 which is provided with spaced interiorly threaded through bores 72 which receive the screw members 66 and 68. The screw members 66 and 68 are provided with cross pins 74 which prevent them from being removed from the bores 72 and at their opposite ends with transversely extending handle portions 76 which aid in tightening and loosening the screw members 66 and 68.

The end cap 20 is provided with a transverse slot 78 for receiving the screw member 66 and which forms a hook portion 80. The end cap 20 is also provided with an enlarged perforation 82 registering with the other through bore 72 provided in the housing member 12. A plate 84 is secured to the end cap 20 and is provided with a reduced diameter perforation 86 in registry with the perforation 82. The screw member 68 extends through the perforations 86, 82 and is received by the threaded bore 72. A crosspin 88 secured to the screw member 68 is positioned within the perforation 82 and upon loosening of the screw member 68 causes the end cap 20 to rise enough to clear the top of the housing member 12.

As the invention has thus far been described the fiilter element 56 is adapted to be axially inserted into the filter chamber 14 and to be supported by the flange portion 62 engaging the flange portion 52 of the mounting member 50. The flange portion 40 of the porting member 36 engages the flange portion 62 of the filter element 56 so that upon tightening the rod 32 into the upstanding portion 26 of the end cap 20, the flange portion 62 is moved axially into seating engagement with the spring mounted mounting member 52.

An outlet housing member 90 is preferably secured to the housing member 12 or is integral therewith and is provided with an outlet chamber 92 in communication with the outlet 24 and a bypass chamber 94 in communication with the bypass outlet 22. The outlet chamber 92 and the bypass chamber 94 are separated by a wall 96 having a central opening 98. An outlet 100 opens to the outlet chamber 92.

A rod 102 extends upwardly through the bypass chamber 94 in axial alignment with the opening 98. The rod 102 axially slidably carries a valve member 104 operable upon axial movement to open and close the opening 98. A spring member 106 urges the valve member 104 to a closed position. A sight rod 108 is fixed to the valve member 104 for axial movement therewith and extends through the outlet chamber 92 and into a chamber 110 formed in a transparent sight member 112.

The preferred embodiment of FIG. 1 operates as follows: Fluid enters the filter chamber 14 through the inlet 18 and flows radially inwardly through the medial portion 58 of the filter element 52, through the opening 63, through the porting member 36 to the outlet 24, the outlet chamber 92 and the outlet 100.

As the filter element 56 becomes clogged to produce an increased pressure differential across the element, the valve member 104 which is subjected on one side to pressure on the inlet side of the filter element 56 and on the other side to pressure on the outlet side will be moved axially along the rod 102 against the spring 106. Movement of the valve member 104 will produce a corresponding movement of the sight rod 108 so that the clogged condition of the filter element 56 will be indicated visually through the sight member 112.

As the filter element 56 continues to become clogged and before the element 56 has reached the point where rupturing is a danger, the valve member 104 will have moved axially sufficiently to open a bypass path directly from the inlet 18 through the bypass outlet 22, the bypass chamber 94, the opening 98, and through the outlet chamber 92 to the outlet 100.

When it is desired to change or clean the filter element 56, the screw members 66–68 and the hand wheel 34 are loosened. The screw members 66–68 as heretofore described, are not intended to be removed from the filter device 10 and upon loosening of the screw members 66–68, the end cap 20 is pivoted in a counterclockwise direction about the screw member 68. The slot 78 permits the end cap 20 and the porting member 36 to be pivoted past the loosened screw member 66. The cross pin 74 and 88 prevent the screw member 66–68 and the end cap 20 from being separated from the housing member 12 so that there is no danger of losing these parts during removal of the filter element 56. The filter element 56 then can be axially removed from the filter chamber.

The cleaned or new filter element 56 is then inserted back into the filter chamber 14. The end cap 20 is pivoted to the closed position and the screw members 66–68 are tightened. Tightening the hand wheel 34 urges the flange portion 62 into seating engagement with the mounting member 52. The spring member 48 and the seal 64 insure that the engagement will be fluid tight and that the filter element 56 will be securely mounted in place.

Figure 4:
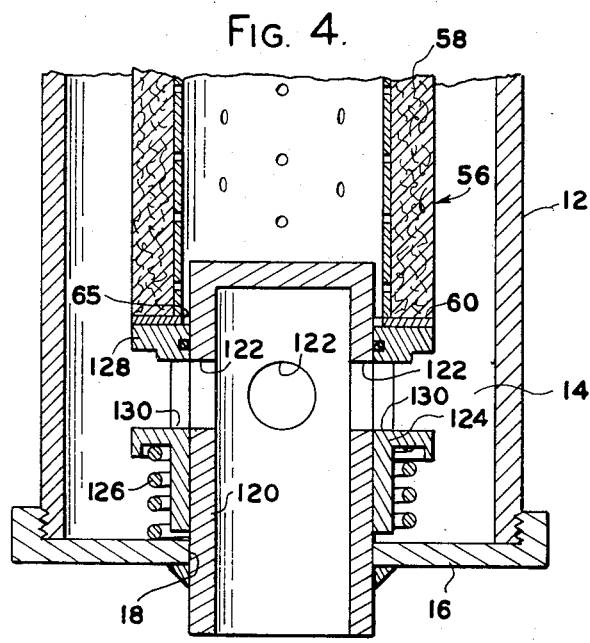
FIG. 4 is an enlarged fragmentary longitudinal cross sectional view illustrating a preferred modified inlet construction for the filter device illustrated in FIG. 1.
Figure 5:
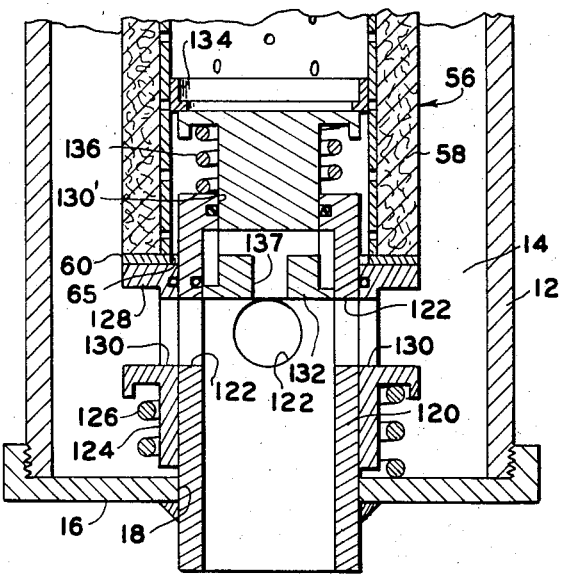
FIG. 5 is a view similar to FIG. 4 but illustrating another preferred inlet construction for the filter device illustrated in FIG. 1.

FIGS. 4–5 illustrate two preferred modified constructions for the inlet to the housing member 12 of the filter device 10 illustrated in FIG. 1. In FIG. 4 the closure plate 60 of the filter element 56 is provided with a central opening 65. A cylindrical porting member 120 is secured to the plate 16 and extends through the inlet 18 into the filter chamber 14. The porting member 120 is closed at its upper end and axially slidably receives the filter element 56 through the opening 63. The porting member 120 is provided with a plurality of annularly spaced openings or ports 122. A valve member 124 is axially slidably mounted about the outer surface of the porting member 120 and is urged upwardly along the porting member 120 by a spring 126. The valve member 124 is provided with an upper radially outwardly extending flange 128 adapted to be engaged by the closure plate 60 of the filter element 56 so that when the filter element 56 is in the mounted position, the valve member 124 is retained in a downward position against the force of the spring 126. The valve member 124 is provided with a plurality of annularly spaced ports 130 which are positioned to register with the ports 122 when the valve member 124 is in the downward position.

In the modification illustrated in FIG. 4, fluid normally flows through the porting member 120 and the ports 122 and 130 to the inlet side of the filter element 56. When the filter element 56 is removed for cleaning or replacement, however, the spring 126 urges the valve member 124 upwardly to a position in which the ports 122 and 130 are no longer in registry so that while the filter element 56 is being cleaned or replaced, fluid is prevented from flowing into and out of the filter chamber 14. If the chamber 14 were allowed to empty, fluid within the filter element 56 would flow in a reverse direction through the element 56 and backwash particles off the outer surface of the element. These particles would be returned to the fluid system connected to the inlet 18.

The modification illustrated in FIG. 5 is similar to that shown in FIG. 4, except that the upper end of the porting member 120 is provided with a central opening 130. A valve member 132 extends through the opening 130 and is urged upwardly against an internal flange 134 provided in the filter element 56 by a spring 136. The valve 132 is provided with ports 137 which open the interior of the filter element 56 to the interior of the porting member 120 at an uppermost position of the valve member 132.

The valve member 132 is normally retained in the closed position by the flange 134. However, as the filter element 56 is being removed, the spring 136 urges the valve member 132 to the upper open position. This opens a fluid path from the interior of the element 56 to the porting member 120. Thus, fluid emptying from the interior of the filter element 56 does not flow in a reverse direction through the element as is normally the case to dislodge the foreign particles accumulating on the inlet side of the element 56 and to return these particles to the fluid system from which they have been removed.

Figure 6:
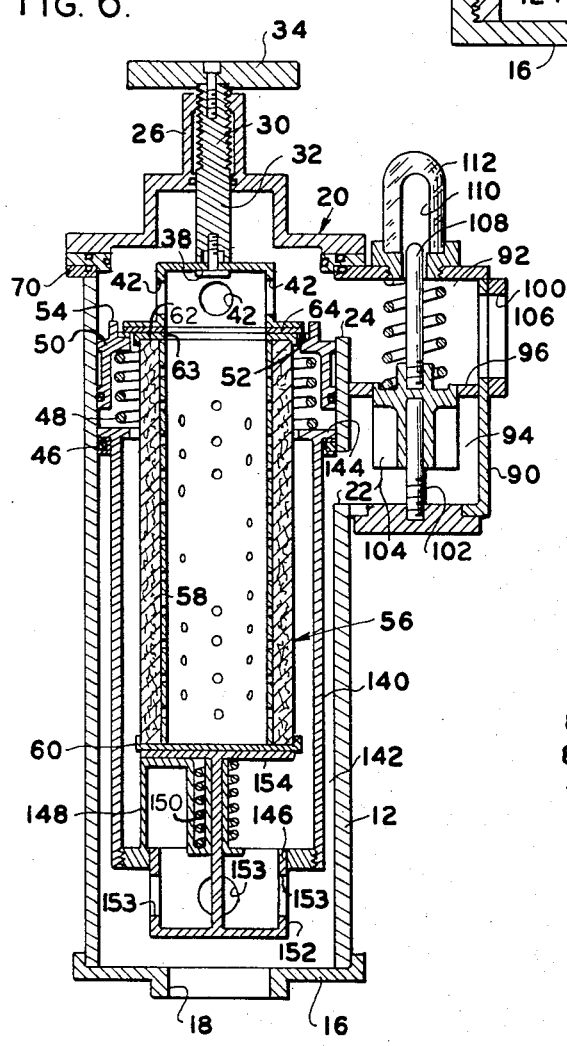
FIG. 6 is a longitudinal cross sectional view of another preferred filter device of the present invention.

The preferred embodiment of FIG. 6 is similar to the embodiment described above with reference to FIGS. 1–3 except means are provided for permitting continued operation of the system while the filter element 56 is being removed for purposes of cleaning or replacement. These means take the form of a cannister 140 encompassing the filter element 56 and defining an annular chamber 142 between the outer surface of the cannister 140 and the inner surface of the housing member 12. The cannister 140 is maintained in position by being provided with a radially outwardly extending upper flange 144 which is urged into seating engagement with the flange portion 46 by the spring member 48.

The lower end of the cannister 140 is provided with an inlet opening 146 and a support member 148 which carries a spring 150. A valve member 152 extends into the opening 146 and is urged to a position closing the opening 146 by the spring 150. The valve member 152 is axially slidably supported by the support member 148 and includes an upper portion 154 which is engaged by the filter element 56 when the filter element 56 is in the mounted position. Engagement of the upper portion 154 by the filter element 56 causes the valve member 152 to be moved downwardly against the spring 150 to a position opening fluid flow through ports 153 and the inlet opening 146.

It is apparent that upon removal of the filter element 56 the valve member 152 closes and fluid flow to the interior of the cannister 140 is prevented. Fluid, however, will continue to flow through the annular chamber 142 to the bypass chamber 94 where the increased pressure differential across the valve member 104 will cause the valve member 104 to open. This provides a fluid path directly from the inlet 18 to the outlet 100 to permit continued operation of the device as the filter element 56 is being removed for cleaning or replacement.

It is apparent that the filter device of the present invention provides for easy cleaning or replacement of the filter element with a minimum loss of time. Since the filter element 56 is not bolted or otherwise fixed to either the housing or the end cap it can be readily removed and installed. The particular construction of the end cap and the method of securing the end cap in place permits it to be moved out of the way to provide access to the filter element. It is not necessary to remove screws or bolts for this purpose and in fact they cannot be removed and the end cap cannot be separated from the housing so that there can be no loss of time while lost parts are being found or replaced.

The preferred modifications provide means for preventing backwash through the filter element as it is being removed and permit the system to continue operating as the element is removed or act to automatically close the inlet to the filter device as the element is removed.

It is also apparent that although I have described but several embodiments and modifications of my invention, many other changes and modifications can be made therein without departing from the spirit of the invention or the scope of the appended claims.

I claim:

1. In a filter device having a housing member defining a filter chamber and an inlet and an outlet open to said filter chamber, a seat member in said housing, a filter element, a flange at the upper edge of said filter element resting on said seat member to seal off the outlet from the inlet, a cover on said housing above the filter element, the improvement which comprises a spring mount fixed to the interior of said housing below said seat member, a spring disposed intermediate said spring mount and said seat member to urge said seat member upwardly into engagement with said filter element flange and means extending through said cover for urging said filter element flange into seating engagement with said seat member and against the action of said spring.

2. The device as defined in claim 1, and including valve means carried intermediate said inlet and the inlet side of said filter element, said valve means normally opening fluid flow through said inlet and into said filter chamber and means urging said valve means toward a closed position upon said filter element being removed from said housing whereby fluid flow from said inlet to said filter chamber is closed.

3. The device as defined in claim 2 and including a second valve means disposed intermediate the outlet side of said filter element and said inlet, means normally urging said second valve means toward a closed position, and means urging said second valve means toward an open position upon said filter element being removed from said housing member.

4. The device as defined in claim 1, and including a normally closed valve means carried in said filter chamber intermediate said inlet and said outlet and means urging said valve means to an open position upon removal of said filter element from said housing.

5. The device as defined in claim 1, and including normally closed pressure responsive valve means disposed intermediate said inlet and said outlet and operable to open a fluid path bypassing said filter element upon the pressure differential across said filter element reaching a predetermined value.

6. The device as defined in claim 5 and including means actuated by said valve means to indicate the position thereof exteriorly of said housing member.

7. A filter device comprising:
 (a) a housing member defining a filter chamber and having an inlet and an outlet registering with said filter chamber,
 (b) a filter element and means supporting said filter element in said filter chamber intermediate said inlet and said outlet,
 (c) an end cap adapted to close said chamber and means pivotally connecting said end cap to said housing member for pivotal movement toward and away from a position closing said filter chamber,
 (d) means carried by said housing member for locking said end cap to said housing member in said closed position of said end cap,
 (e) said supporting means comprising a support member movably carried in said filter chamber, biasing means urging said support member toward said end cap, and means carried by said end cap urging said filter element into engagement with said support member,
 (f) a first valve means carried in said housing at the end of said filter element opposite said end cap and disposed intermediate said inlet and the inlet side of said filter element, biasing means urging said first valve means toward a closed position, said filter element end engaging said first valve means upon insertion of said filter element into said filter chamber to urge said valve means toward an open position and disengaging from said first valve means upon removal of said filter element from said filter chamber to permit said valve means to move to a closed position, and (g) a second valve means disposed adjacent said first valve means and intermediate the outlet side of said filter element and said inlet, biasing means urging said second valve means to an open position, and said filter element having means engaging said second valve means upon insertion of said filter element into said filter chamber to urge said second valve means toward a closed position and disengaging from said second valve means upon removal of said filter element to open a path from the interior of said filter element to said inlet.

8. The device as defined in claim 7 and including bypass means opening a fluid path directly from said inlet to said outlet upon the pressure differential across said filter element reaching a predetermined value.

9. The device as defined in claim 8 and including means indicating the position of said bypass means exteriorly of said housing member.

10. A filter device comprising:
(a) a housing member defining a filter chamber and having an inlet and an outlet registering with said filter chamber,
(b) a filter element and means supporting said filter element in said filter chamber intermediate said inlet and said outlet,
(c) said supporting means comprising a support member movably carried in said filter chamber, biasing means mounted in said filter chamber and urging said support member in one direction, and said filter element being provided with an outwardly extending flange portion at one end thereof to engage said support member and thereby position said filter element in said filter chamber intermediate said inlet and said outlet and means carried by said housing for urging said filter element axially into sealing engagement with said support member,
(d) bypass valve means carried in said housing at the end of said filter element opposite said support member and normally retained in a closed position by engagement with means on said filter element and movable to an open position upon removal of said filter element from said filter chamber to open a bypass path directly from said inlet to said outlet.

11. A filter device comprising:
(a) a housing member defining a filter chamber and having an inlet and an outlet registering with said filter chamber,
(b) a filter element and means supporting said filter element in said filter chamber intermediate said inlet and said outlet,
(c) an end cap adapted to close said chamber and means pivotally connecting said end cap to said housing for pivotal movement toward and away from a position closing said filter chamber,
(d) means carried by said housing member for locking said end cap to said housing member in said closed position of said end cap,
(e) supporting means comprising a support member movably carried in said filter chamber, biasing means urging said support member toward said end cap, and means carried by said end cap for urging said filter element into engagement with said support member, and
(f) a tubular member extending into said filter chamber at the end opposite said end cap and defining said inlet, said tubular member having a plurality of ports to provide communication between said inlet and said filter chamber, a cylindrical valve member slidably disposed over said tubular member and including ports which in one axial position of said valve member register with said tubular member ports, biasing means urging said valve member toward a position in which said ports are not in registry and therefore said tubular member ports are closed by said valve member, and the end of said filter element engaging said valve member upon insertion of said filter element into said filter chamber to urge said valve member toward a position in which said ports are in registry.

12. The filter device as defined in claim 11 and in which said tubular member is open at its interior end and a second valve member is disposed within said open end intermediate the outlet side of said filter element and said inlet, biasing means urging said second valve member toward an open position and said filter element being provided with means urging said second valve member toward a closed position upon insertion of said filter element into place in said filter chamber.

References Cited
UNITED STATES PATENTS

| | | | |
|---|---|---|---|
| 2,544,244 | 3/1951 | Vokes | 210—234 |
| 2,982,413 | 5/1961 | Kraissl | 210—131 |
| 3,150,633 | 9/1964 | Holl | 210—90 X |
| 3,161,589 | 12/1964 | Burckhalter | 210—232 X |
| 3,273,715 | 9/1966 | Rosaen | 210—234 X |
| 3,295,679 | 1/1967 | Rosaen | 210—131 X |

SAMIH N. ZAHARNA, *Primary Examiner.*